(12) United States Patent
Qiao et al.

(10) Patent No.: US 11,061,202 B2
(45) Date of Patent: Jul. 13, 2021

(54) METHODS AND DEVICES FOR ADJUSTING LENS POSITION

(71) Applicant: BEIJING XIAOMI MOBILE SOFTWARE CO., LTD., Beijing (CN)

(72) Inventors: Zhang Qiao, Beijing (CN); Xiaolong Chen, Beijing (CN); Kunpeng Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 240 days.

(21) Appl. No.: 16/416,945

(22) Filed: May 20, 2019

(65) Prior Publication Data
US 2019/0369357 A1 Dec. 5, 2019

(30) Foreign Application Priority Data
May 30, 2018 (CN) .......... 201810542177.2

(51) Int. Cl.
*G02B 7/28* (2021.01)
*H04N 5/232* (2006.01)

(52) U.S. Cl.
CPC .......... *G02B 7/28* (2013.01); *H04N 5/23212* (2013.01)

(58) Field of Classification Search
CPC ......... H04N 5/23212; H04N 5/232123; H04N 5/232122; H04N 5/23218; H04N 5/36961; H04N 5/23219; H04N 5/23293; H04N 5/232933; H04N 5/232125; H04N 5/23245; H04N 5/3696; H04N 9/04557; H04N 5/23296; H04N 5/2254; H04N 5/23209; H04N 5/232121; H04N 5/232133; H04N 5/23258; H04N 5/2354; H04N 5/247;
(Continued)

(56) References Cited

U.S. PATENT DOCUMENTS

| | | |
|---|---|---|
| 2010/0158343 A1 | 6/2010 | Bryll |
| 2013/0321693 A1 | 12/2013 | Lin |
| 2018/0074287 A1* | 3/2018 | Nystrom ................ G02B 7/285 |

FOREIGN PATENT DOCUMENTS

| | | |
|---|---|---|
| DE | 102009029478 A1 | 6/2010 |
| EP | 2261507 A1 | 12/2010 |
| TW | 201350955 A | 12/2013 |

OTHER PUBLICATIONS

Extended European Search Report of counterpart EP Application No. 19177313.4 dated Oct. 10, 2019, (7p).

* cited by examiner

*Primary Examiner* — Brandi N Thomas
(74) *Attorney, Agent, or Firm* — Arch & Lake LLP

(57) ABSTRACT

A method for adjusting lens position, includes: controlling a lens in a photographing component to be sequentially located at m first lens positions during a focusing process, and acquiring a first definition of an image captured by the photographing component at each of the first lens positions, where $m \geq 3$; selecting a first relationship curve in a focusing curve library according to a matching condition, the focusing curve library including at least two relationship curves between definitions and lens positions captured at different focusing distances, and the matching condition being used to indicate a degree of similarity between the m first lens positions as well as the first definitions and the relationship curves; and controlling the lens to be located at a target lens position corresponding to a maximum definition indicated by the first relationship curve.

17 Claims, 7 Drawing Sheets

(58) Field of Classification Search
CPC ........ H04N 5/361; H04N 5/3745; H04N 7/18; H04N 5/222; H04N 5/225251; H04N 5/232; H04N 5/23287; H04N 5/235; H04N 5/2351; G03B 13/36; G03B 3/10; G03B 13/20; G03B 2205/0046; G03B 17/14; G03B 13/32; G03B 15/05; G03B 2206/00; G03B 13/34; G03B 15/006; G03B 3/04; G03B 7/22; G02B 7/34; G02B 7/282; G02B 7/28; G02B 7/09; G02B 7/102; G02B 7/38; G02B 7/10; G02B 7/285; G02B 15/14; G02B 15/144109; G02B 27/646; G02B 5/32; G02B 7/008; G02B 7/028; G02B 7/04; G02B 7/08; G02B 7/346
See application file for complete search history.

METHODS AND DEVICES FOR ADJUSTING LENS POSITION

CROSS-REFERENCE TO RELATED APPLICATION

This application is based upon and claims priority to Chinese Patent Application No.: 201810542177.2, filed May 30, 2018, the entire contents of which are incorporated herein by reference.

TECHNICAL FIELD

The present disclosure relates to the technical field of electronics, and in particular, to a method and device for adjusting lens position.

BACKGROUND

With the development of the electronic technology, most terminals (such as mobile phones) have camera functions. In addition, the terminal can automatically adjust the position of the lens thereof so that the terminal can capture a clear image through the lens.

In the related art, when the terminal adjusts the position of the lens thereof, it is necessary to control the lens to move multiple times to determine a range of lens position where a clearer image can be captured. Then, the terminal needs to control the lens to further move multiple times within the range of lens position and determine the lens position where the clearest image can be captured within the range of lens position. Afterwards, the terminal may control the lens to be located in this lens position.

SUMMARY

The present disclosure provides method and device for adjusting lens position, capable of solving the problem that the steps of adjusting the lens position are cumbersome and the speed is relatively slow. The technical solutions are as follows.

According to an aspect of the present disclosure, there is provided a method for adjusting lens position including: controlling a lens in a photographing component to be sequentially located at m first lens positions during a focusing process, and acquiring a first definition of an image captured by the photographing component at each of the first lens positions, where m≥3; selecting a first relationship curve in a focusing curve library according to a matching condition, the focusing curve library including at least two relationship curves between definitions and lens positions captured at different focusing distances, and the matching condition being used to indicate a degree of similarity between the m first lens positions as well as the first definitions and the relationship curves; and controlling the lens to be located at a target lens position corresponding to a maximum definition indicated by the first relationship curve.

According to another aspect of the present disclosure, there is provided a device for adjusting lens position, comprising: a first controller configured to control a lens in a photographing component to be sequentially located at m first lens positions, during a focusing process, and acquire a first definition of an image captured by the photographing component at each of the first lens positions, where m≥3; a look-up circuitry configured to look up a first relationship curve in a focusing curve library according to a matching condition, the focusing curve library including at least two relationship curves between definitions and lens positions captured at different focusing distances, and the matching condition being used to indicate a degree of similarity between the m first lens positions as well as the first definitions and the relationship curves; and a second controller configured to control the lens to be located at a target lens position corresponding to the maximum definition indicated by the first relationship curve.

According to yet another aspect of the present disclosure, there is provided a terminal, comprising: a processing component; and a memory for storing instructions executable by the processing component. The processing component is configured to: control a lens in a photographing component to be sequentially located at m first lens positions during a focusing process, and acquiring a first definition of an image captured by the photographing component at each of the first lens positions, where m≥3; look up a first relationship curve in a focusing curve library according to a matching condition, the focusing curve library including at least two relationship curves between definitions and lens positions captured at different focusing distances, and the matching condition being used to indicate a degree of similarity between the m first lens positions as well as the first definitions and the relationship curves; and control the lens to be located at a target lens position corresponding to a maximum definition indicated by the first relationship curve.

According to still yet another aspect of the present disclosure, there is provided a readable storage medium having stored thereon instructions, wherein the readable storage, when run on a processing component, causes the processing component to perform the above-mentioned method for adjusting lens position.

The technical solutions of the present disclosure may at least bring the following advantageous benefits:

BRIEF DESCRIPTION OF THE DRAWINGS

To describe the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still be able to derive other drawings from these accompanying drawings without creative efforts.

The accompanying drawings, which are incorporated in and constitute a part of this specification, illustrate embodiments consistent with the present disclosure and, together with the description, serve to explain the principles of the present disclosure.

DETAILED DESCRIPTION

The present disclosure will be described in further detail with reference to the accompanying drawings, to clearly present the objects, technical solutions, and advantages of the present disclosure. Apparently, the embodiments described are only some embodiments, and are not representative of all embodiments. Based on the embodiments of the present disclosure, all other embodiments obtained by a person of ordinary skill in the art without any creative efforts shall fall within the protection scope of the present disclosure.

In the related art, when the terminal adjusts the position of the lens thereof, it needs to control the lens to move in two stages, which results in a cumbersome step to adjust the lens position with a relatively low speed.

It is to be understood that both the foregoing general description and the following detailed description are exemplary and explanatory only and are not restrictive of the present disclosure.

With the development of the electronic technology, a camera or a terminal (such as a mobile phone) can automatically move a lens in a photographing component to a target lens position in the course of capturing an image, so that a clear image may be captured by the photographing component. However, during the process to determine the target lens position, the lens is generally controlled to move more frequently, which results in a cumbersome step of moving the lens to the target lens position, with a relatively low speed. In the method for adjusting lens position provided by the embodiments of the present disclosure, the target lens position can be determined just by moving the lens for fewer times, such that the step of moving the lens to the target lens position can be simplified, and the speed of moving the lens to the target lens position can be increased.

Figure 1:
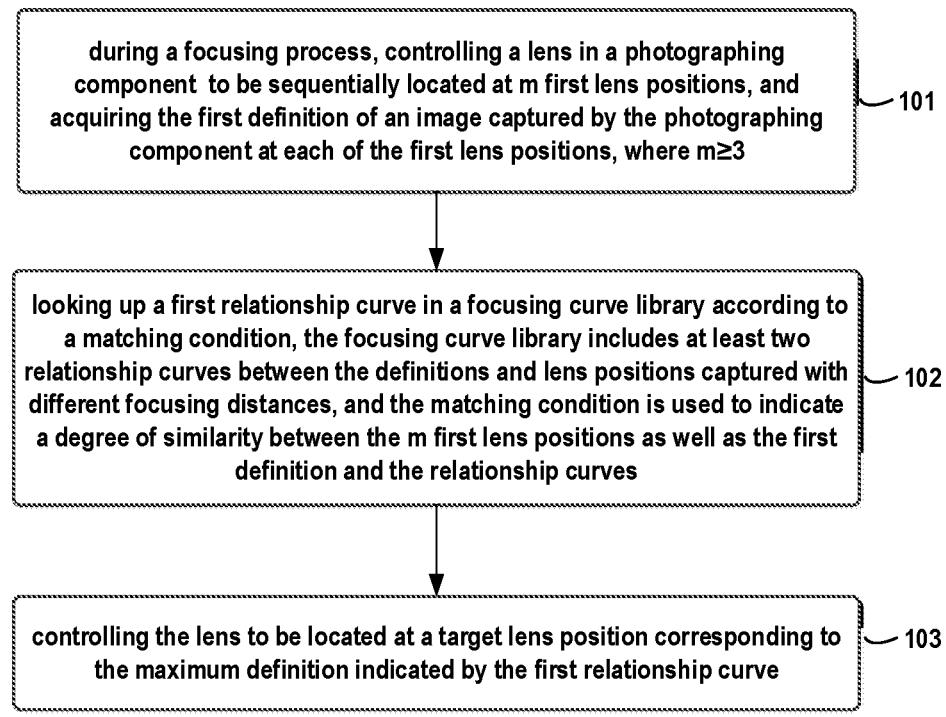
FIG. 1 is a flowchart of method for adjusting lens position according to an example.

FIG. 1 is a flowchart of method for adjusting lens position according to an example. The method may be applied in device for adjusting lens position. As shown in FIG. 1, the method may include the following steps.

In step 101, during a focusing process, controlling a lens in a photographing component to be sequentially located at m first lens positions, and acquiring the first definition of an image captured by the photographing component at each of the first lens positions, where m≥3.

In step 102, selecting a first relationship curve in a focusing curve library according to a matching condition, the focusing curve library includes at least two relationship curves between the definitions and lens positions captured with different focusing distances, and the matching condition is used to indicate a degree of similarity between the m first lens positions as well as the first definition and the relationship curves.

In step 103, controlling the lens to be located at a target lens position corresponding to the maximum definition indicated by the first relationship curve.

In summary, according to the method for adjusting lens position provided by the embodiments of the present disclosure, in the focusing process, it is only necessary to control the lens to be sequentially located at the m first lens positions, and determine the first relationship curve in the focusing curve library according to the m first lens positions and the acquired first definitions, such that the lens can be controlled to move to the target lens position corresponding to the maximum image definition indicated by the first relationship curve. That is, when the lens position is adjusted, the target lens position can be determined by just controlling the lens to move in one stage. Therefore, the step of adjusting the lens position is relatively simple, and the speed relatively high.

Figure 2:
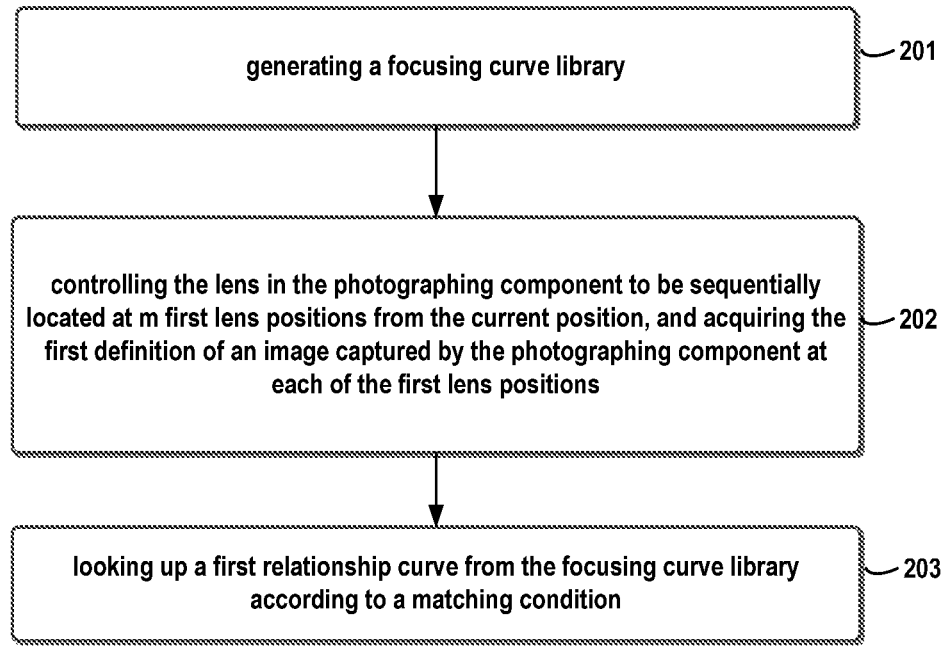
FIG. 2 is a flowchart of another method for adjusting lens position according to an example.

FIG. 2 is a flowchart of another method for adjusting lens position shown according to an example. This method may be applied to a device for adjusting lens position. As shown in FIG. 2, this method may comprise the following steps.

In step 201, generating a focusing curve library.

The device for adjusting lens position may generate the focusing curve library before the photographing component in a terminal or camera performs focusing. The focusing curve library may include at least two relationship curves between the definitions and lens positions captured with different focusing distances.

The photographing component may comprise a lens and other photosensitive elements, such as a CCD (Charge-coupled Device). The device for adjusting lens position can capture images through the lens and other photosensitive elements. When the photographing component captures the images, the captured images is usually displayed on a display screen of the terminal or camera, and a focusing frame is also displayed. The focusing distance refers to a distance between a position of an object in the focusing frame and the terminal or camera. In addition, the lens in the photographing component may move within a movable position range within the terminal or camera, and the movable position range is a position range located on an optical axis of the lens. When the display screen displays each frame of an image, the device for adjusting lens position can determine the lens position at this time, and the definition of each frame of the image, which can also be represented by a focusing value. Optionally, the device for adjusting lens position may also determine only the definition of a part of the image within the focusing frame in each frame of the image.

It is taken, in the embodiments of the disclosure, that the device for adjusting lens position generates the focusing curve library as an example. Optionally, the focusing curve library may also be acquired by the device for adjusting lens position via Internet.

The process of generating the focusing curve library will be described below.

When the focusing curve library is generated, the device for adjusting lens position may first acquire reference definitions of images captured by the photographing component at multiple reference lens positions, the multiple reference lens positions being multiple positions at one focusing distance. Then, the device for adjusting lens position may perform curve fitting according to the multiple reference lens positions and the acquired reference definitions to obtain a second relationship curve, and store the second relationship curve in the focusing curve library. That is, a curve in the focusing curve library is obtained. The steps of generating the relationship curve and storing the relationship curve in the focusing curve library are performed repeatedly to obtain the focusing curve library including multiple relationship curves.

Optionally, after one relationship curve is stored in the focusing curve library each time, it can be determined whether the number of the relationship curves stored in the focusing curve library is greater than or equal to a predetermined threshold of number. When the number of the relationship curves stored in the focusing curve library is greater than or equal to the predetermined threshold of number, it is determined that the generation of the focusing curve library is completed and the step of continuing to generate the relationship curves is stopped. When the number of the relationship curves in the focusing curve library is greater than or equal to the predetermined threshold of number, it can be considered that the excellent rate of the focusing curve library is relatively high. That is, the requirement for determining the target lens position in more photographing scenes can be satisfied.

In step 202, controlling the lens in the photographing component to be sequentially located at m first lens positions from the current position, and acquiring the first definition of an image captured by the photographing component at each of the first lens positions.

In the focusing process, the device for adjusting lens position may control the lens in the photographing component to move m−1 steps from the current position in a fixed step size, such that the lens sequentially moves to m−1 positions to obtain m first lens positions. The m first lens positions include the current position and the m−1 positions. In addition, the m first lens positions are all within the movable position range. For example, in case of m≥3, the m first lens positions are all located on an optical axis of the lens. The value of m may be predetermined, such as m=3 or 4.

When the lens is located at each of the first lens positions, the device for adjusting lens position may control the photographing component to capture images, and calculate a first definition of the captured image. That is, when the lens is located at each of the first lens positions, the first definition of the image captured by the photographing component is acquired. When the lens is sequentially located at the m first lens positions, the device for adjusting lens position may acquire m first definitions of the images acquired when the lens is located at the m first lens positions, i.e., acquire the m first definitions corresponding to the m first lens positions.

Figure 3:
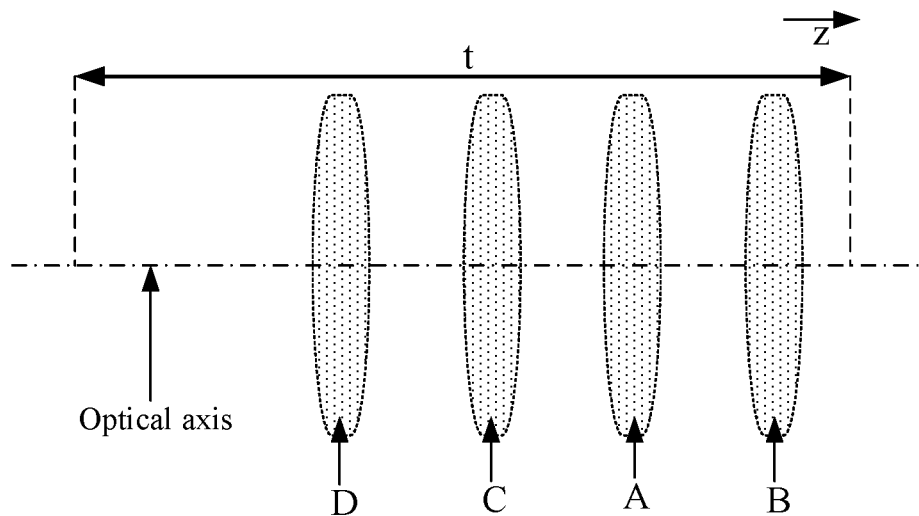
FIG. 3 is a schematic diagram of a lens position according to an example.

Optionally, when the device for adjusting lens position acquires the m first lens positions, the number of steps for controlling the lens to move may be more than m−1 steps. Exemplarily, referring to FIG. 3, assuming that m=4, a range in which the lens may be moved is a movable position range t. If the current position of the lens is position A, when the lens moves one step from position A in a fixed step size in a first direction z, and then reaches position B, the distance between position B and one end of the movable position range t at this time is less than one step size, the device for adjusting lens position may control the lens to continue moving in this fixed step size in a direction opposite to the first direction z, and then to pass through position A and sequentially to move to position C and position D, thereby obtaining the m first lens positions. The m first lens positions include: position A, position B, position C, and position D, and the lens moves by a total of 4 steps in this process.

In step 203, looking up a first relationship curve from the focusing curve library according to a matching condition. The device may select the first relationship curve from the focusing curve library according to the matching condition.

It should be noted that the matching condition indicates the degree of similarity between the m first lens positions as well as the first definitions and the relationship curves in the focusing curve library. Exemplarily, the matching condition may be: a difference between the first definition corresponding to each of the first lens positions among the m first lens positions and a second definition is less than a definition threshold, and the second definition is a definition corresponding to each of the first lens positions in the first relationship curve. Here, the matching condition may indicate a degree of similarity between a first definition curve and the relationship curves, wherein the first definition curve is defined by the m first lens positions and the first definitions.

Figure 4:
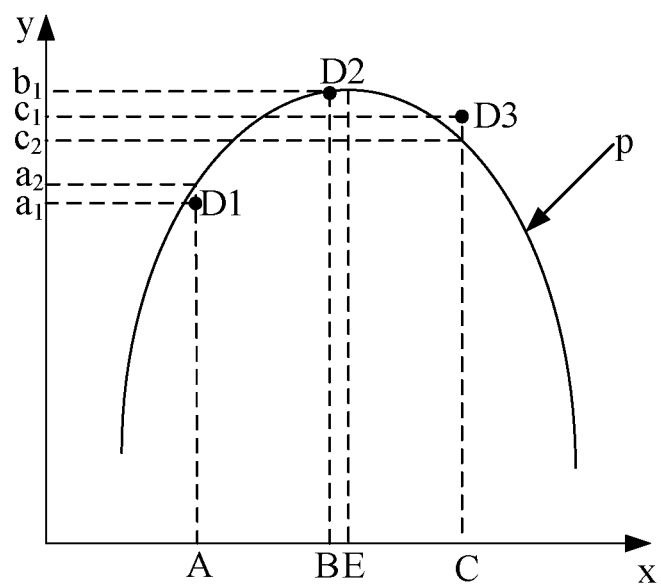
FIG. 4 is a schematic diagram of a first relationship curve according to an example.

For example, assuming m=3 in step 202, the device for adjusting lens position controls the lens to sequentially move from the current position (such as position A) to position B and position C in the first direction. That is, the m first lens positions include position A, position B, and position C. In addition, the first definition corresponding to position A is $a_1$, the first definition corresponding to position B is $b_1$, and the first definition corresponding to position C is $c_1$. Referring to FIG. 4, in a coordinate axis where a horizontal coordinate x refers to a lens position and the vertical coordinate y refers to an image definition, point D1 may represent a corresponding relationship between position A and the first definition $a_1$, point D2 may represent a corresponding relationship between position B and the first definition $b_1$, and point D3 may represent a corresponding relationship between position C and the first definition $c_1$.

If relationship curve p shown in FIG. 4 is a relationship curve in the focusing curve library, the second definition corresponding to position A in relationship curve p is $a_2$, the second definition corresponding to position B is also $b_1$, the second definition corresponding to position A is $c_2$, and a difference between $a_1$ and $a_2$ and a difference between $c_1$ and $c_2$ are both less than the predetermined definition threshold, the device for adjusting lens position may determine that relationship curve p satisfies the matching condition and the relationship curve p is determined as the first relationship curve found in the focusing curve library.

In step 204, controlling the lens to be located at a target lens position corresponding to the maximum definition indicated by the first relationship curve.

After the device for adjusting lens position finds the first relationship curve, the target lens position corresponding to the maximum definition indicated by the first relationship curve may be determined, and the lens may be controlled to move to the target lens position. Exemplarily, if the device for adjusting lens position determines in step 203 that the relationship curve p is the first relationship curve, it may be determined that the target lens position corresponding to the maximum definition indicated by the relationship curve p is position E, and the lens may be controlled to move to the position E.

In the related art, when the photographing component focuses automatically, the terminal needs to control the lens to move in a first step size for multiple times in a first stage, and acquires a definition of an image captured by the photographing component after each movement of the lens, thereby determining a position range of the lens in which the terminal acquires a clear image. Then, the terminal needs to control the lens to move in a second step size for multiple times within this position range in a second stage, the second step size needs to be less than the first step size, and continues to acquire the definition of the image captured by the photographing component after each movement of the lens. Then, the terminal may determine a position corresponding to the acquired maximum definition in a movement position of the second stage, and move the lens to this position. Since the lens is moved frequently and the step size of the movement needs to be changed, an image displayed in the terminal during autofocus is unclear, and the process of autofocus is cumbersome and slow.

In the embodiments of the present disclosure, when the photographing component performs autofocus, the device for adjusting lens position only needs to control the lens to move m−1 steps in a fixed step size to obtain m first lens positions, and acquire the first definition of the image captured when the lens located at each of the first lens positions. Then, according to the m first lens positions and the acquired m first definitions, the first relationship curve is looked up from the focusing curve library, and the lens is moved to the target lens position corresponding to the maximum definition indicated by the first relationship curve.

The value of m in the embodiments of the present disclosure may be a predetermined fixed value, such as m=3 or 4. That is, in the embodiments of the disclosure, the target lens position may be determined by just moving the lens for two times or three times such that autofocus is completed without changing the step size of the movement. Therefore, the number of movements of the lens is reduced, and the speed of determining the target lens position is increased, thereby accelerating the speed of the autofocus, and making the image displayed in the terminal clear during the autofocus. In addition, when the lens is located at the target lens position, the definition of the image captured by the photographing component is also relatively high.

In summary, according to the method for adjusting lens position provided by the embodiments of the present disclosure, in the focusing process, it is only necessary to control the lens to be sequentially located at the m first lens positions, and determine the first relationship curve in the focusing curve library according to the m first lens positions and the acquired first definitions, such that the lens can be controlled to move to the target lens position corresponding to the maximum image definition indicated by the first relationship curve. That is, when the lens position is adjusted, the target lens position can be determined by just controlling the lens to move in one stage. Therefore, the step of adjusting the lens position is relatively simple, and the speed is relatively high.

It should be noted that, in the above-described embodiment, the first relationship curve being able to be found by the device for adjusting lens position from the focusing curve library is taken as an example only. Optionally, if the device for adjusting lens position cannot find the first relationship curve in the focusing curve library, the following steps may be performed.

Figure 5:
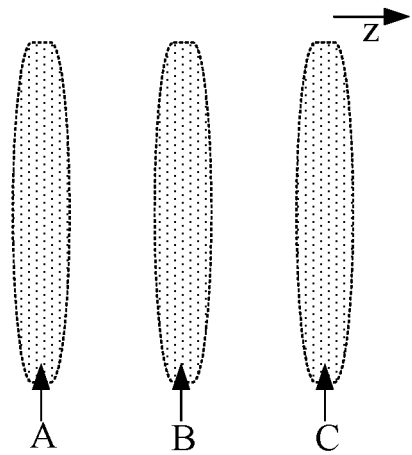
FIG. 5 is a schematic diagram of another lens position according to an example.

First, the device for adjusting lens position may determine whether a predetermined condition is established, and the predetermined condition may include: for three consecutive lens positions in the m first lens positions, the first definition of the image captured by the photographing component at the second lens position is the highest. Referring to FIG. 5, assuming m=3, the m first lens positions include position A, position B, and position C which are sequentially arranged along the first direction z. That is, whether the predetermined condition is established is determined, that is, it is determined whether the first definition of the image captured by the photographing component at position B is the highest for position A, position B, and position C.

On the one hand, if the device for adjusting lens position determines that the predetermined condition is established, the lens may be controlled to move n steps in a predetermined step size between the first lens position and the third lens position on the optical axis of the lens, such that the lenses are sequentially located at n second lens positions and a third definition of an image captured by the photographing component at each second lens position is acquired. Where n≥1, the predetermined step size is less than a fixed step size.

Then, the device for adjusting lens position may determine the maximum third definition among the acquired n third definitions, and control the lens to move to the second lens position corresponding to the maximum third definition. That is, the lens is controlled to move to the second lens position, where the maximum third definition can be acquired, among the n second lens positions.

On the other hand, if the device for adjusting lens position determines that the predetermined condition is not established, a change law of the definitions of the images captured by the photographing component when the position where the lens is located sequentially changes along the first direction may be determined. Then, the device for adjusting lens position may control the lens to continue moving according to the change law until the lens is sequentially located at three consecutive lens positions, and the definition of the image captured by the photographing component at the second lens position is the highest.

If the first definition captured by the device for adjusting lens position is sequentially increased when the lens is sequentially located at the position A, the position B, and the position C, it may be determined that the law of change in the image definitions is a law of progressive increase. At this time, the device for adjusting lens position may determine that the lens position where the maximum image definition can be acquired is on one side of the position C away from the position B. Therefore, the device for adjusting lens position may control the lens to continue moving along the first direction z until the image definition captured by the device for adjusting lens position is lower than the previously acquired image definition. Thereafter, the device for adjusting lens position may perform the steps after determining that the predetermined condition is established.

If the first definition acquired by the device for adjusting lens position is sequentially decreased when the lens is sequentially located at the position A, the position B, and the position C, it may be determined that the law of change of the image definitions is a law of progressive decrease. At this time, the device for adjusting lens position may determine that the lens position where the maximum image definition can be acquired is on one side of the position A away from the position B. Therefore, the device for adjusting lens position may control the lens to continue moving in a direction opposite to the first direction z until the image definition reacquired by the device for adjusting lens position is lower than the image definition previously acquired. Then, the device for adjusting lens position may perform the steps after determining that the predetermined condition is established.

Finally, after the lens is moved to a second lens position where a maximum third definition can be acquired among the n second lens positions, the device for adjusting lens position may perform curve fitting based on the m first lens positions, m first definitions of the images captured at the m first lens positions, n second lens positions and n third definitions of the images captured at the n second lens positions to obtain a third relationship curve, and add the third relationship curve into the focusing curve library. If the third relationship curve satisfies the matching condition, the device for adjusting lens position may determine the third relationship curve as a first relationship curve, and determine to move the lens to the target lens position corresponding to the maximum definition indicated by the third relationship curve.

In this way, the focusing curve library is updated, such that the number of the relationship curves in the focusing curve library is more and more. Further, the focusing curve library may satisfy the requirement of determining the target lens position in more photographing scenes.

Figure 6:
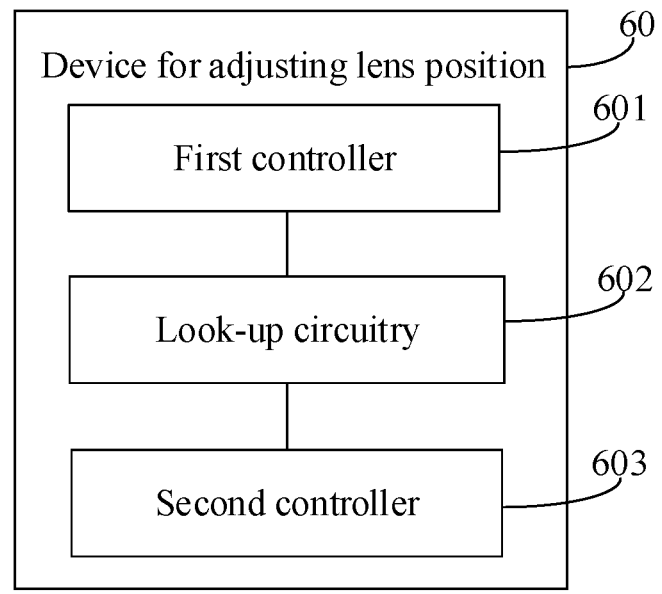
FIG. 6 is a schematic diagram of a structure of device for adjusting lens position according to an example.

FIG. 6 is a schematic diagram of a structure of a device for adjusting lens position according to an example. As shown in FIG. 6, the device for adjusting lens position 60 may include:

a first controller 601 configured to, during a focusing process, control lenses in a photographing component to be sequentially located at m first lens positions, and acquire a first definition of an image captured by the photographing component at each of the first lens positions, where m≥3;

a look-up circuitry 602 configured to look up a first relationship curve in a focusing curve library according to a matching condition, wherein the focusing curve library includes at least two relationship curves between definitions and lens positions captured with different focusing distances, and the matching condition is used to indicate a degree of similarity of the m first lens positions as well as the first definitions and the relationship curves; and a second controller 603 configured to control the lens to be located at a target lens position corresponding to the maximum definition indicated by the first relationship curve.

In summary, according to the device for adjusting lens position provided by the embodiments of the present disclosure, in the focusing process, the first controller only needs to control the lens to be sequentially located at the m first lens positions, and the look-up circuitry determines the first relationship curve in the focusing curve library according to the m first lens positions and the acquired first definitions, such that the second controller can control the lens to move to the target lens position corresponding to the maximum image definition indicated by the first relationship curve. That is, when the lens position is adjusted, the target lens position can be determined by just controlling the lens to move in one stage. Therefore, the step of adjusting the lens position is relatively simple, and the speed is relatively high. The first controller and the third controller may be implemented in a single processor or different processors.

Optionally, the matching condition may include:

for each of the m first lens positions, a difference between the first definition corresponding to the first lens position and a second definition is less than a definition threshold, and the second definition is a definition, which corresponds to the first lens position, in the first relationship curve. For example, the device may identify m second definitions corresponding to the m first lens positions in each relationship curve in the focusing curve library. For each of the m first lens positions, the device may obtain a difference between each first definition and each second definition and then select a first relationship curve where the difference between each first definition and each second definition is less than a definition threshold. The difference may be an absolute difference that measures a distance between first definition and second definition.

Figure 7:
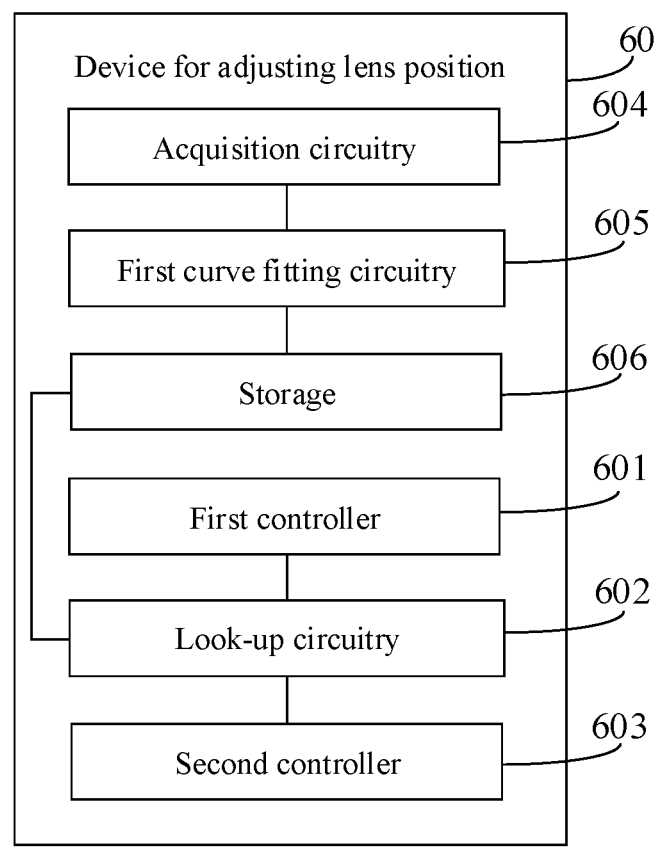
FIG. 7 is a schematic diagram of a structure of another device for adjusting lens position according to an example.

Optionally, FIG. 7 is a schematic diagram of a structure of another device for adjusting lens position according to an example. As shown in FIG. 7, on the basis of FIG. 6, the device for adjusting lens position 60 may further include:

an acquisition circuitry 604 configured to acquire reference definitions of images captured by the photographing component at multiple reference lens positions, the multiple reference lens positions being multiple lens positions at the same focusing distance;

a first curve fitting circuitry 605 configured to perform curve fitting according to the multiple reference lens positions and the acquired reference definitions to obtain a second relationship curve; and a storage 606 configured to store the second relationship curve in the focusing curve library.

Figure 8:
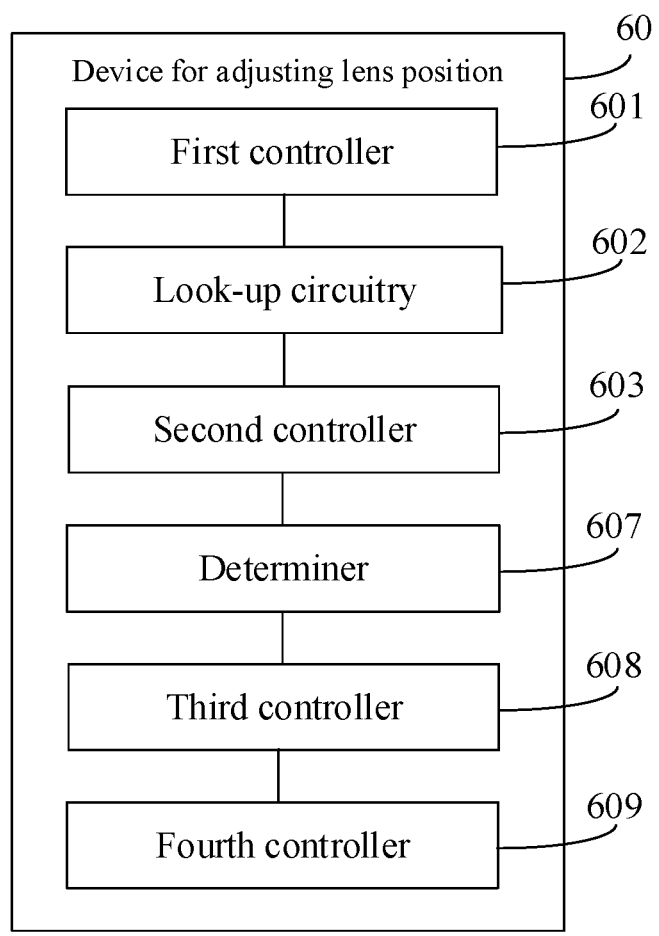
FIG. 8 is a schematic diagram of a structure of yet another a device for adjusting lens position according to an example.

Optionally, the m first lens positions are all located on an optical axis of the lens. FIG. 8 is a schematic diagram of a structure of yet another device for adjusting lens position according to an example. As shown in FIG. 8, on the basis of FIG. 6, the device for adjusting lens position 60 further may further include:

a determiner 607 configured to determine whether a predetermined condition is established when the first relationship curve cannot be found in the focusing curve library, wherein the predetermined condition includes: for three consecutive lens positions among the m first lens positions, the first definition of the image captured by the photographing component at the second lens position is the highest;

a third controller 608 configured to, when the predetermined condition is established, control the lens to be sequentially located at n second lens positions, and acquire a third definition of an image captured by the photographing component at each of the second lens positions, in which n≥1, wherein the second lens position is located between the first lens position and a third lens position which are located on the optical axis of the lens; and a fourth controller 609 configured to control the lens to move to the second lens position where a maximum third definition can be acquired.

Figure 9:
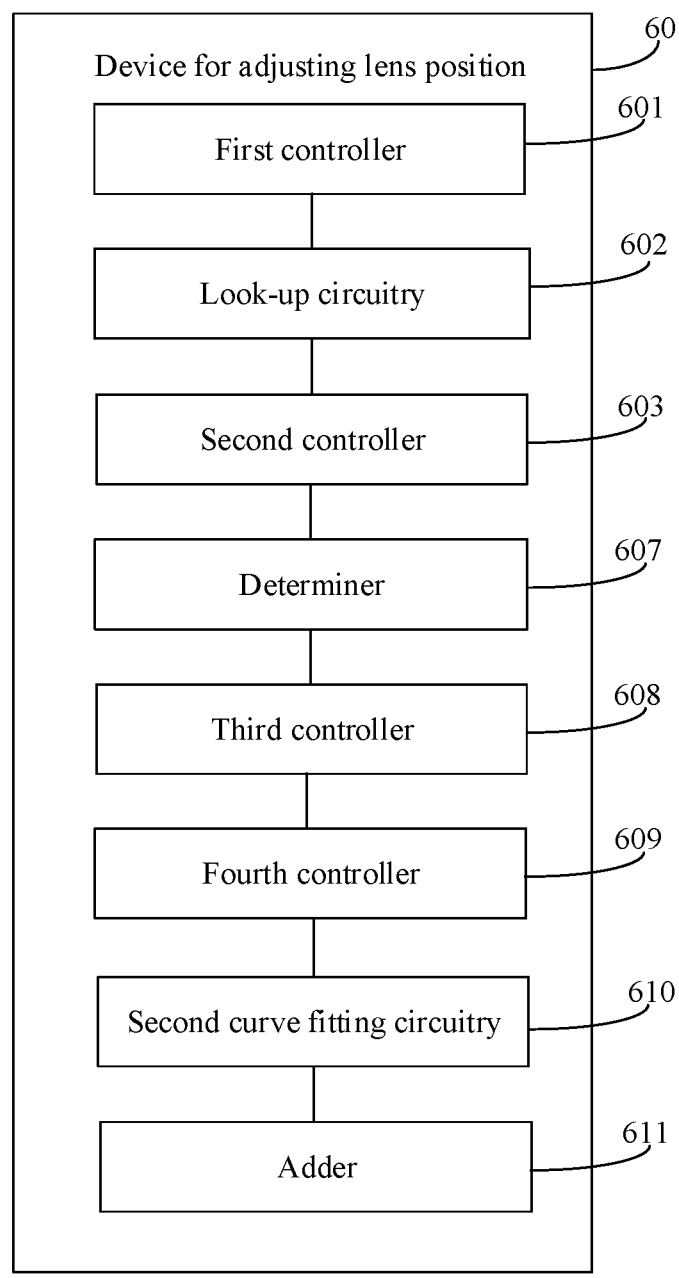
FIG. 9 is a schematic diagram of a structure of still yet another a device for adjusting lens position according to an example.

Optionally, FIG. 9 is a schematic diagram of a structure of still yet another device for adjusting lens position according to an example. As shown in FIG. 9, on the basis of FIG. 8, the device for adjusting lens position 60 may further include:

a second curve fitting circuitry 610 configured to perform curve fitting according to the m first lens positions, the m first definitions of the images acquired at the m first lens positions, the n second lens positions and the n third definitions of the images captured at the n second lens positions to obtain a third relationship curve; and an adder 611 configured to add the third relationship curve into the focusing curve library.

Optionally, the number of relationship curves in the focusing curve library is greater than or equal to a predetermined threshold of number.

Optionally, the first controller 601 is further configured to:

control the lens to move m−1 steps from the current position in a fixed step size, such that the lens is sequentially moved to m−1 positions, wherein the m first lens positions include: a current position and m−1 positions.

Optionally, m=3 or 4.

In summary, according to the device for adjusting lens position provided by the embodiments of the present disclosure, in the focusing process, the first controller only needs to control the lens to be sequentially located at the m first lens positions and the look-up circuitry determines the first relationship curve in the focusing curve library according to the m first lens positions and the acquired first definitions, such that the second controller can control the lens to move to the target lens position corresponding to the maximum image definition indicated by the first relationship curve. That is, when the lens position is adjusted, the target lens position may be determined by just controlling the lens to move in one stage. Therefore, the step of adjusting the lens position is relatively simple, and the speed is relatively high.

Figure 10:
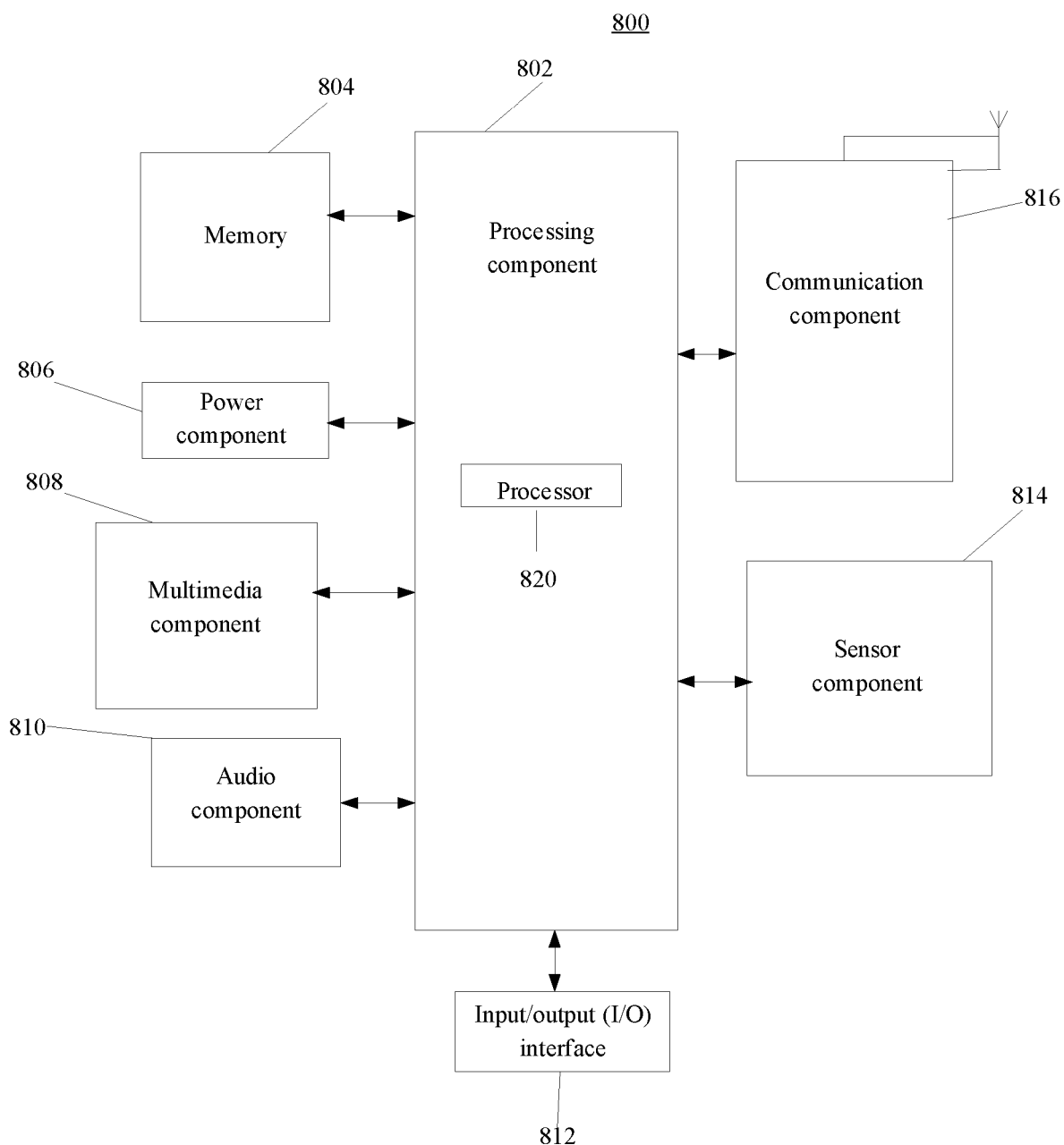
FIG. 10 is a block diagram of a terminal according to an example.

FIG. 10 is a block diagram of a terminal 800 for according to an example. The terminal 800 may be used to determine a lens position. For example, the terminal 800 may be a camera, a mobile phone, a computer, a digital broadcast terminal, a messaging device, a gaming console, a tablet device, a medical device, exercise equipment, a personal digital assistant, and the like.

Referring to FIG. 10, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls the overall operations of the terminal 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on the terminal 800, contact data, phonebook data, messages, pictures, video, etc. The memory 804 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power for the terminal 800.

The multimedia component 808 includes a screen providing an output interface between the terminal 800 and the user. Optionally, the screen may include a liquid crystal display (LCD) and a touch panel (TP). If the screen includes a touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 808 includes a front camera and/or a rear camera, and both the front camera and the rear camera can be the above-described camera components and both include the lens described above. The front camera and/or the rear camera may receive external multimedia data while the terminal 800 is in an operation mode, such as a photographing mode or a video mode. Each of the front camera and the rear camera may be a fixed optical lens system or have focal length and optical zoom capability.

The audio component 810 is configured to output and/or input audio signals. For example, the audio component 810 includes a microphone ("MIC") configured to receive an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker for outputting audio signals.

The I/O interface 812 provides an interface between the processing component 802 and peripheral interface modules, such as a keyboard, a click wheel, buttons, and the like. The buttons may include, but are not limited to, a home button, a volume button, a start button, and a lock button.

The sensor component 814 includes one or more sensors to provide status assessments of various aspects for the terminal 800. For instance, the sensor component 814 can detect an on/off status of the terminal 800, relative positioning of components, e.g., the display and the mini keypad of the terminal 800. The sensor component 814 can also detect a position change of the terminal 800 or a component of the terminal 800, the presence or absence of the user contact with the terminal 800, orientation or acceleration/deceleration of the terminal 800, and a temperature change of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal 800 and other devices. The terminal 800 can access a wireless network based on a communication standard, such as Wi-Fi, 2G, or 3G, or a combination thereof. In an example, the communication component 816 receives broadcast signals or broadcast associated information from an external broadcast management system via a broadcast channel. In an example, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the terminal 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In examples, a non-transitory computer-readable storage medium including instructions is also provided, such as the memory 804 including the instruction which is executable by the processor 820 in the terminal 800, for performing the above-described methods. For example, the non-transitory computer-readable storage medium may be a ROM, a RAM, a CD-ROM, a magnetic tape, a floppy disc, an optical data storage device, and the like.

Method and device for adjusting lens position are provided in the present disclosure. According to the method for adjusting lens position provided by the embodiments of the present disclosure, in the focusing process, it is only necessary to control the lens to be sequentially located at the m first lens positions and determine the first relationship curve in the focusing curve library according to the m first lens positions and the acquired first definitions, such that the lens may be controlled to move to the target lens position corresponding to the maximum image definition indicated by the first relationship curve. That is, when the lens position is adjusted, the target lens position may be determined by just controlling the lens to move in one stage. Therefore, the step of adjusting the lens position is relatively simple, and the speed thereof is relatively high.

The above-mentioned embodiments shown in FIGS. 1 and 2 can be implemented in whole or in part by software, hardware, firmware, or any combination thereof. When implemented by software, these embodiments can be implemented in whole or in part in a form of a program product that includes one or more instructions. When the instructions are loaded up to and executed by a processing component, the procedures or functions described in accordance with the embodiments of the present disclosure are generated in whole or in part.

It should be noted that the method embodiments provided by the embodiments of the present disclosure and the corresponding device embodiments can be cross-referenced, which will not be limited in the embodiments of the present disclosure. According to the method embodiments provided by the embodiments of the present disclosure, the sequence of steps can be adjusted appropriately, and the steps can be increased or decreased as the circumstances may require. Any method variations that can be easily conceived by those skilled in the art within the technical scope of the present disclosure should fall within the protection scope of the present disclosure and therefore will not be described again.

Those skilled in the art can easily conceive other embodiments of the present disclosure after taking the description into consideration and practicing the solution disclosed herein. The present application is intended to cover any variations, uses, or adaptive changes of the present disclosure. These variations, uses, or adaptive changes follow the general principles of the present disclosure and include common general knowledge or conventional technical means in the art that are not disclosed herein. The above description and embodiments are to be regarded as being exemplary only. The true scope and spirit of the present disclosure are subject to the appended claims.

It should be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for adjusting lens position, including:
controlling a lens in a photographing component to be sequentially located at m first lens positions during a focusing process, and acquiring a first definition of an image captured by the photographing component at each of the first lens positions, where m is an integer no less than 3;
selecting a first relationship curve in a focusing curve library according to a matching condition, the focusing curve library including at least two relationship curves between definitions and lens positions captured at different focusing distances, and the matching condition indicating a degree of similarity between a first definition curve and the relationship curves, wherein the first definition curve is defined by the m first lens positions and the first definitions; and
controlling the lens to move to a target lens position corresponding to a maximum definition indicated by the first relationship curve.

2. The method according to claim 1, wherein selecting the first relationship curve in the focusing curve library according to the matching condition comprises:
identifying m second definitions corresponding to the m first lens positions in each relationship curve in the focusing curve library;
for each of the m first lens positions, obtaining a difference between each first definition and each second definition; and
selecting the first relationship curve where the difference between each first definition and each second definition is less than a definition threshold.

3. The method according to claim 2, further comprising:
acquiring reference definitions of images captured by the photographing component at multiple reference lens positions, the multiple reference lens positions being multiple lens positions under the same focusing distance;
performing curve fitting according to the multiple reference lens positions and the acquired reference definitions to obtain a second relationship curve; and
storing the second relationship curve in the focusing curve library.

4. The method according to claim 2, wherein the m first lens positions are all located on an optical axis of the lens, and the method further comprises:
determining whether a predetermined condition is established when the first relationship curve cannot be found in the focusing curve library, the predetermined condition includes: the first definition of the image captured by the photographing component at the second lens position being the highest for three consecutive lens positions among the m first lens positions;
when the predetermined condition is established, controlling the lens to be sequentially located at n second lens positions, and acquiring a third definition of an image captured by the photographing component at each of the second lens positions, where n≥1, the second lens position being located between the first lens position and a third lens position which are on the optical axis of the lens; and
controlling the lens to move to the second lens position where a maximum third definition can be acquired.

5. The method according to claim 4, further comprising:
performing curve fitting according to the m first lens positions, the m first definitions of the images acquired at the m first lens positions, the n second lens positions and the n third definitions of the images captured at the n second lens positions to obtain a third relationship curve; and
adding the third relationship curve into the focusing curve library.

6. The method according to claim 1, wherein the number of relationship curves in the focusing curve library is greater than or equal to a predetermined threshold of number.

7. The method according to claim 1, wherein the step of controlling the lens in the photographing component to be sequentially located at the m first lens positions includes:
controlling the lens to move m−1 steps from current position in a fixed step size to enable the lens to be sequentially moved to m−1 positions, wherein
the m first lens positions include the current position and the m−1 positions.

8. The method according to claim 1, wherein m is less than 5.

9. A device for adjusting lens position, comprising:
a first controller configured to control a lens in a photographing component to be sequentially located at m first lens positions, during a focusing process, and acquire a first definition of an image captured by the photographing component at each of the first lens positions, where m is an integer no less than 3;
a look-up circuitry configured to look up a first relationship curve in a focusing curve library according to a matching condition, the focusing curve library including at least two relationship curves between definitions and lens positions captured at different focusing distances, and the matching condition indicating a degree of similarity between a first definition curve and the relationship curves, wherein the first definition curve is defined by the m first lens positions and the first definitions; and
a second controller configured to control the lens to move to a target lens position corresponding to the maximum definition indicated by the first relationship curve.

10. The device according to claim 9, wherein the matching condition includes:
a difference between the first definition corresponding to the first lens position and a second definition being less than a definition threshold for each of the m first lens positions, and the second definition being a definition, which corresponds to the first lens position, in the first relationship curve.

11. The device according to claim 10, further comprising:
an acquisition circuitry configured to acquire reference definitions of images captured by the photographing component at multiple reference lens positions, the multiple reference lens positions being multiple lens positions under the same focusing distance;
a first curve fitting circuitry configured to perform curve fitting according to the multiple reference lens positions and the acquired reference definitions to obtain a second relationship curve; and
a storage configured to store the second relationship curve in the focusing curve library.

12. The device according to claim 10, further comprising:
a determiner configured to determine whether a predetermined condition is established when the first relationship curve cannot be found in the focusing curve library, the predetermined condition includes: the first definition of the image captured by the photographing component at the second lens position being the highest for three consecutive lens positions among the m first lens positions;
a third controller configured to, when the predetermined condition is established, control the lens to be sequentially located at n second lens positions, and acquire a third definition of an image captured by the photographing component at each of the second lens positions, where n≥1, the second lens position being located between the first lens position and a third lens position which are on the optical axis of the lens; and
a fourth controller configured to control the lens to move to the second lens position where a maximum third definition can be acquired.

13. The device according to claim 12, further comprising:
a second curve fitting circuitry configured to perform curve fitting according to the m first lens positions, the m first definitions of the images acquired at the m first lens positions, the n second lens positions and the n third definitions of the images captured at the n second lens positions to obtain a third relationship curve; and
an adder configured to add the third relationship curve into the focusing curve library.

14. The device according to claim 10, wherein the number of relationship curves in the focusing curve library is greater than or equal to a predetermined threshold of number.

15. The device according to claim 10, wherein the first controller is further configured to:
control the lens to move m−1 steps from the current position in a fixed step size to enable the lens to be sequentially moved to m−1 positions,
wherein the m first lens positions include the current position and the m−1 positions.

16. The device according to claim 10, wherein m is less than 5.

17. A terminal, comprising:
a processing component; and
a memory for storing instructions executable by the processing component;
wherein the processing component is configured to:
control a lens in a photographing component to be sequentially located at m first lens positions during a focusing process, and acquire a first definition of an image captured by the photographing component at each of the first lens positions, where m is an integer no less than 3,
look up a first relationship curve in a focusing curve library according to a matching condition, the focusing curve library including at least two relationship curves between definitions and lens positions captured at different focusing distances, and the matching condition being used to indicate indicating a degree of similarity between a first definition curve and the relationship curves, wherein the first definition curve is defined by the m first lens positions and the first definitions; and
control the lens to move to a target lens position corresponding to a maximum definition indicated by the first relationship curve.

* * * * *